United States Patent Office 2,992,754
Patented July 18, 1961

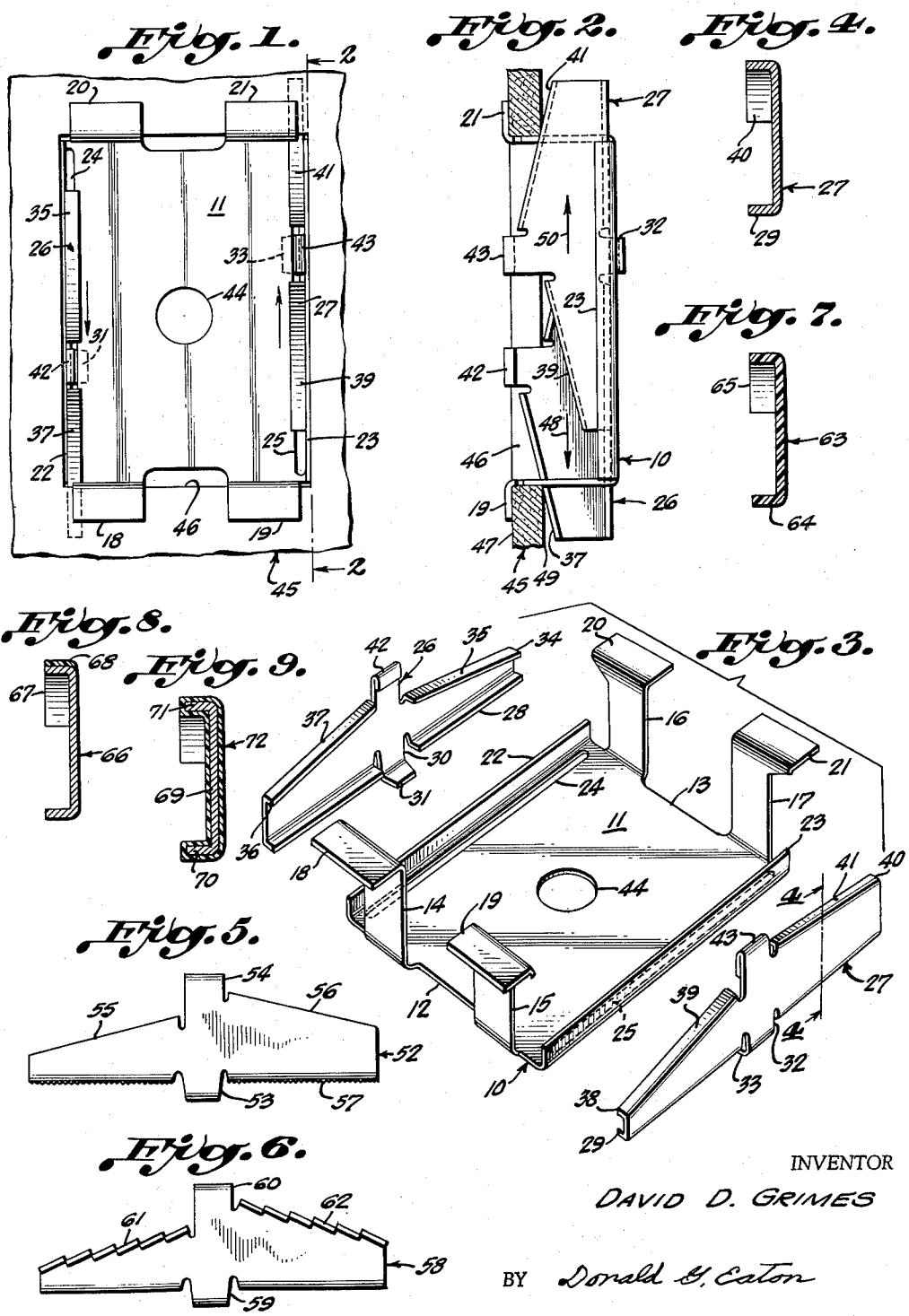

2,992,754
UNIVERSAL BRACKET FOR MOUNTING IN A PANEL OR WALL OPENING
David D. Grimes, 9905 Woodland Drive, Silver Spring, Md.
Filed June 22, 1960, Ser. No. 38,044
12 Claims. (Cl. 220—18)

This invention relates to hardware and more particularly to a universal bracket for mounting in a panel or wall opening, which bracket may be utilized to mount or secure many different types of articles or devices in place.

While the device of this invention is primarily intended to be utilized for mounting electrical devices, such as outlet boxes, switches or the like, in a panel or wall opening, nevertheless, this is for illustrative purposes only and the invention is not in any way limited to such uses, but may be utilized for mounting almost any desired article or device on a wall or panel.

Heretofore, many different types of devices have been developed and utilized for mounting electrical outlet boxes and the like in panel or wall openings, but many of these have been relatively complex and costly to manufacture and also do not conveniently accommodate widely varying panel or wall thicknesses. Furthermore, these prior art devices have, in many cases, been relatively flimsy in construction resulting in an insecure mounting and also many of these devices have either required the use of special tools to install the same or have proved quite difficult to install, particularly in the hands of an unskilled person and where the mounting device required the disassembly of one or more parts prior to installation in the panel or wall opening and subsequent reassembly of such parts, considerable time is consumed and there is also the likelihood of misplacing or losing some of the parts, thereby resulting in further delay and increased cost of installation.

At the present time, it is quite widespread and common practice for homeowners and others to install additional electric outlets and switches in their homes or places of abode and the operation of installing the outlet box or switch in a panel or wall opening has proved to be one of the most difficult operations confronting such relatively unskilled persons. Frequently, such electrical outlets or boxes are installed and secured in place by wood screws, and in many instances, such screws are merely driven into the plaster wall which results in a very insecure fastening and frequently during use, the box or switch becomes loose and may in extreme cases be pulled entirely out of the wall opening. Consequently, a relatively simple inexpensive device for facilitating mounting electrical outlet boxes, switches or the like in panel or wall openings and which accommodates a widely varying thickness of wall or panel represents a material step forward in the art.

It is accordingly an object of the present invention to provide a universal bracket for mounting in a panel or wall opening and which will accommodate widely varying panel or wall thicknesses.

A further object of the invention is the provision of a universal bracket for mounting in a panel or wall opening, which bracket may be conveniently and economically constructed from readily available materials, the bracket constituting only three parts which remain in assembled relationship at all times.

A still further object of the invention is the provision of a universal bracket for mounting in a panel or wall opening in which sliding wedges are provided for clamping the bracket in the panel or wall opening, the only tool required being a screw driver or other suitable driving tool for driving the wedges into clamping position.

Another object of the invention is the provision of a universal bracket for mounting in a panel or wall opening, such bracket incorporating clamping wedges for engaging the panel or wall, the degree of taper of such wedges being such as to frictionally lock the wedges in clamping position.

A further object of the invention is the provision of a universal bracket for mounting in a panel or wall opening, such bracket incorporating clamping wedges for engaging the panel or wall and in which one edge of the wedges is serrated to engage a portion of the bracket and lock the wedges in clamping position.

A still further object of the invention is the provision of a universal bracket for mounting in a panel or wall opening, such bracket incorporating clamping wedges and in which the wedges are provided with stepped tapered surfaces for engaging the panel or wall to lock the wedges in clamping position.

A further object of the invention is the provision of a universal bracket for mounting in a panel or wall opening, such bracket incorporating clamping wedges for engaging the panel or wall and in which such wedges are formed of a molded plastic to provide a yieldable engagement with the panel or wall and with the bracket to lock the wedges in clamping position.

Another object of the invention is the provision of a universal bracket for mounting in a panel or wall opening, such bracket incorporating clamping wedges and in which the wall or panel engaging surface of such wedges is coated with a plastic material to engage the wall or panel and lock the wedges in clamping position.

A further object of the invention is the provision of a universal bracket for mounting in a panel or wall opening, such bracket incorporating clamping wedges for engaging the wall or panel and in which the entire surface of such wedges are coated with a plastic material to provide a yieldable engagement between the wedges and the wall or panel and also between the wedges and portions of the bracket to lock the wedges in clamping position.

Further objects and advantages of the invention will be apparent from the following description taken in conjunction with the accompanying drawing wherein:

FIG. 1 is a plan view of a universal bracket constructed in accordance with this invention and showing the same mounted in a panel or wall opening and clamped in place therein;

FIG. 2 a sectional view taken substantially on the line 2—2 of FIG. 1 and showing the manner in which the clamping wedges engage the rear surface of the wall or panel to clamp the bracket in place thereon;

FIG. 3 an exploded view in perspective showing the structure of the bracket constructed in accordance with this invention;

FIG. 4 a sectional view taken substantially on the line 4—4 of FIG. 3;

FIG. 5 an elevational view showing a slightly modified form of clamping wedge;

FIG. 6 an elevational view showing a further modified form of clamping wedge;

FIG. 7 a transverse sectional view showing a clamping wedge formed of molded plastic;

FIG. 8 a transverse sectional view showing a clamping wedge having the tapered surface coated with a plastic material; and FIG. 9 a transverse sectional view showing the entire surface of a clamping wedge coated with a plastic material.

With continued reference to the drawing and particularly FIGS. 1 to 4, there is shown a bracket constructed in accordance with this invention and which may well comprise a base member 10 of sheet material and such base member may be formed as a metal stamping, a cast plastic member or may be formed in any other suitable way and of any suitable material. The base member 10 may include a generally rectangular base portion 11 and on each end edge 12 and 13 of the base portion 11 are a pair of legs 14 and 15 and 16 and 17. The legs 14, 15, 16 and 17 extend at substantially right angles to the base portion 11 and such legs terminate in outwardly projecting ears 18, 19, 20 and 21 respectively. The purpose and use of such ears will be later described.

A flange 22 is provided on one side edge of the base portion 11 and a similar flange 23 is provided on the opposite side edge of the base portion 11. Flanges 22 and 23 are disposed at substantially right angles to the base portion 11 and adjacent the flange 22 there is provided an elongated slot 24 in the base portion 11 and a similar slot 25 is provided in the base portion 11 adjacent the flange 23.

A pair of elongated slidable clamping wedges 26 and 27 are provided and such wedges are of generally channel formation with an inturned flange 28 forming the lower edge of wedge 26 while an inturned flange 29 forms the lower edge of wedge 27. Wedge 26 is provided with a downwardly extending tongue 30 having an inturned lower end 31 and the wedge 27 is provided with a downwardly extending tongue 32 having an inwardly extending lower end 33. Wedge 26 is provided at one end with an inturned upper flange 34 tapered outwardly from the midpoint of the wedge 26 and providing a tapered upper edge 35. In a similar manner, the wedge 26 is provided at the opposite end with an inturned flange 36 tapering outwardly from the midpoint of the wedge 26 and providing a tapered upper edge 37. It is to be noted that the maximum height of the tapered end 35 of the wedge 26 is substantially equal to the minimum height of the upper edge 37 of the wedge 26. The purpose of such structure will be later described.

In a similar manner, wedge 27 is provided at one end with an upper inturned flange 38 which is tapered from the midpoint of the wedge 32 outwardly to provide a tapered upper surface 39 on end and the opposite end of the wedge 27 is provided with an inturned flange 40 tapering outwardly from the midpoint of the wedge 27 to provide an upper tapered surface 41 on that end of the wedge 27. As with the wedge 26, the maximum height of the tapered surface 39 at one end of the wedge 27 is substantially equal to the minimum height of the tapered surface 41 at the opposite end of the wedge 27. The purpose of such structure will be later described.

The length of the clamping wedges 26 and 27 is equal to or less than the length of the base portion 11 and the wedges 26 and 27 are assembled with the base member 10 for slidable movement relative thereto by inserting the tongue 30 through the slot 24 and with the lower end 31 of the tongue 30 extending beneath the base portion 11 to hold the wedge 26 slidably mounted on the base member 10, as clearly shown in FIGS. 1 and 2. In a similar manner, the tongue 32 of the wedge 27 extends through the slot 25 with the lower end 33 of the tongue 32 extending beneath the base portion 11 to hold the wedge 27 in assembled slidable relationship on the base member 10. The wedges 26 and 27 are held in proper alignment by engagement with the side flanges 22 and 23 respectively extending upwardly from the base portion 11. Wedge 26 is provided with an outwardly extending lug 42 intermediate the length thereof and wedge 27 is provided with a similar outwardly extending lug 43 intermediate the length thereof. The purpose of lugs 42 and 43 will be presently described. The base portion 11 may be provided with an aperture 44 therein for facilitating securing an electrical device or other device thereto and, of course, if desired, other means for fastening articles or other devices to the base portion 11 may be provided. It is to be noted, that the wedges 26 and 27 are assembled on the base member 10 with the lower tapered surface 35 of wedge 26 opposite the upper tapered surface 41 of wedge 27 and with the lower tapered surface 39 of wedge 27 opposite the upper tapered surface 37 of wedge 26. The purpose of this relationship will appear during a description of the operation of this device which is to follow.

In the operation of the bracket above described and with particular reference to FIGS. 1 and 2, there is shown a panel or wall 45 provided with an opening 46 therein for receiving the base member 10 of the bracket of this invention. As clearly shown, the ears 18, 19, 20 and 21 engage the front surface 47 of the panel or wall 45 and since the length of the wedges 26 and 27 is equal to or less than the length of the base member 10 of the bracket, it will be seen that the bracket may pass easily through the opening 46 to the position shown in FIGS. 1 and 2. In order to clamp the bracket in place in the opening 46 in the panel or wall 45 it is only necessary to move the wedge 26 in the direction of the arrow 48 to engage the upper surface 37 of the wedge 26 with the rear surface 49 of the panel or wall 45 and to move the wedge 27 in the direction of the arrow 50 to engage the upper surface 41 of the wedge 27 with the rear surface 39 of the panel or wall 45. The lugs 42 and 43 may be engaged by a screw driver or other driving tool to drive the tapered surfaces 37 and 41 of the wedges 26 and 27 respectively into firm clamping engagement with the rear surface 49 of the panel or wall 45 and this will, of course, operate to securely clamp the base member 10 of the bracket in the opening 46 of the wall 45.

As shown in FIG. 2, the panel or wall 45 is relatively thin and consequently, the upper surfaces 37 and 41 of the wedges 26 and 27 respectively are utilized for clamping purposes, but in the event the wall or panel 45 is thicker, the wedges may be driven in a direction opposite to the arrows 48 and 50 to bring the lower upper surfaces 35 and 39 of the wedges 26 and 27 respectively into engagement with the rear surface 49 of the panel or wall 45. The tapered surfaces 35, 37, 39 and 41 may be provided with what is commonly known as a "sticky taper" or in other words, the degree of taper of such surfaces is such that upon firm engagement with the rear surface 49 of the panel or wall 45, the wedges 26 and 27 will be frictionally held in position to firmly lock such wedges in clamping position and firmly hold the base member 10 of the bracket in place. If it is desired to remove the bracket at any time, it is only necessary to drive the wedges into a central position whereupon the base member 10 may be removed through the opening 46.

It will, therefore, be seen that after cutting the opening 46 in the wall or panel 45, the only tool required to install the bracket of this invention in the opening 46 is a screw driver or other driving tool, such as a punch, which may be engaged with the lugs 42 and 43 of the wedges 26 and 27 respectively to drive such wedges in one direction or the other into clamping position depending upon the thickness of the wall or panel 45. It will also be obvious that a wide range of panel thicknesses may be accommodated, since this is determined by the distance from the lower end of the lower tapered end of the wedge members to the upper end of the upper tapered end of the wedge members and since this distance is relatively great all common thicknesses of walls or panels may be accommodated.

With particular reference to FIG. 5, there is shown a modified form of clamping wedge 52 which is similar to the clamping wedges above described, in that there is provided a downwardly extending securing tongue 53, an outwardly extending actuating lug 54 and tapered upper surfaces 55 and 56, but the lower surface of the wedge 52 is serrated, as shown at 57 and such serrated surface 57 will engage the upper surface of the base portion 11 of the base member 10 to provide additional friction for holding the wedge 52 in clamping position and also as the wedge 52 moves outwardly of the base member 10 to clamping position, the wedge 52 will tend to tilt thereby causing the teeth of the serrated portion 57 to engage the edge of the base portion 11 to provide in the nature of a ratchet engagement which will securely lock the wedge in clamping position.

A further modified form of locking wedge is shown in FIG. 6 in which a wedge 58 is provided with a downwardly extending tongue 59 for securing the wedge in place on the base member 10 and also with an upwardly extending actuating lug 60. The upper end surfaces of the wedge 58 are provided with stepped tapered portions 61 on the lower end of the wedge 58 and with similar stepped tapered portions 62 on the upper end of the wedge 58. In the use of this form of the clamping wedge, the stepped portions 61 or 62 depending upon the thickness of the panel or wall, are driven into engagement therewith and provide in the nature of a ratchet engagement in which the edges of the stepped portions will bite into the surface of the panel or wall to securely lock the wedge 58 in clamping position.

A still further modified form of clamping wedge is shown in FIG. 7 in which the wedge 63 may be of the same general configuration as the wedges 26 and 27, but the wedge 63 is formed as a molded plastic member which, of course, is slightly yieldable and as a consequence, when driven into clamping position as shown in FIG. 2, a portion of the lower edge 64 of the wedge 63 will tend to flow over the edge of the base portion 11 of the base member 10 thereby providing in the nature of a ridge to firmly lock the wedge 23 in clamping position. The wedge 23 is, of course, provided with a tapered upper clamping surface 65 and it will be understood that surfaces of different height will be provided at each end of the wedge 63 as described in connection with the previous clamping wedges.

With reference to FIG. 8, there is shown another modified form of the invention in which a metallic clamping wedge 66 is provided with a tapered upper clamping surface 67 which is coated with a plastic material 68 which provides a yielding engagement with the rear surface of the panel or wall with which the clamping wedge 66 engages and the plastic coating 68 may be of a nature which will soften slightly due to friction caused by driving the wedge into clamping engagement thereby providing an adhesive bond between the wedge and the wall or panel or the plastic coating 68 may merely yield sufficiently to provide additional frictional engagement with the wall or panel to securely lock the wedge 66 in clamping position.

A still further modified form of clamping wedge is shown in FIG. 9 in which a metal wedge member 69 having a lower base portion engaging flange 70 and a tapered upper clamping surface 71 is coated over the entire surface of the wedge member 69 with a plastic coating 72 which will serve to enhance the frictional engagement between the wedge 72 and the base portion 11 and also between the tapered clamping surface 71 and the rear surface of the wall or panel with which the wedge engages. This will operate to securely lock the wedge 69 in clamping position.

It will be seen that by the above described invention there has been provided a relatively simple, yet highly effective universal bracket for mounting in a panel or wall opening in which all of the parts are permanently assembled and in which the bracket may be installed in a panel or wall opening by a simple driving operation with a screw driver or other driving tool in order to securely clamp the bracket in position. Obviously, the bracket may be clamped in position prior to attaching an article or electrical device thereto or such article or device may be secured to the bracket and the entire assembly installed in the wall opening and securely clamped therein by actuation of the clamping wedges.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A bracket for mounting in an opening in panels of different thicknesses, said bracket comprising a base member of sheet material, said base member including a generally rectangular base portion, a pair of legs extending from each end edge of said base portion at substantially right angles thereto, each leg terminating in an outwardly projecting ear, a flange on each side edge of said base portion disposed at substantially right angles thereto and an elongated slot in said base portion adjacent each flange, a pair of elongated slidable clamping wedges mounted on said base portion, the length of each wedge being equal to or less than the length of said base portion, each wedge engaging the inner surface of one of said flanges and with the inner edge of each wedge engaging said base portion, a tongue intermediate the length of each wedge projecting through the adjacent slot and extending beneath said base portion to secure said wedges thereto, the outer edge of each wedge being tapered in opposite directions from the midpoint, the maximum height of one end of each wedge being substantially equal to the minimum height at the opposite end to provide a low and a high end to accommodate a wide range of panel thicknesses and an outwardly extending lug on each wedge between said low and high ends for engagement by a driving tool, the low end on one wedge being disposed opposite the high end on the other wedge, whereby said bracket may be mounted in an opening in a panel with said ears engaging the outer surface of the panel and upon movement of said wedges in opposite directions one tapered end on each wedge will engage the rear surface of the panel to clamp said bracket in place.

2. A bracket as defined in claim 1 in which the degree of taper on the ends of said wedges is such as to frictionally lock said wedges in clamping position.

3. A bracket for mounting in an opening in panels of different thicknesses, said bracket comprising a base member of sheet material, said base member including a generally rectangular base portion, a pair of legs extending from each end edge of said base portion at substantially right angles thereto, each leg terminating in an outwardly projecting ear, a flange on each side edge of said base portion disposed at substantially right angles thereto and an elongated slot in said base portion adjacent each flange, a pair of elongated slidable clamping wedges mounted on said base portion, the length of each wedge being equal to or less than the length of said base portion, each wedge engaging the inner surface of one of said flanges and with the inner edge of each wedge engaging said base portion, a tongue intermediate the length of each wedge projecting through the adjacent slot and extending beneath said base portion to secure said wedges thereto, the outer edge of each wedge being tapered in opposite directions from the midpoint, the maximum height of one end of each wedge being substantially equal to the minimum height at the opposite end to provide a low and a high end to accommodate a wide range of panel thicknesses and the low end on one wedge being disposed opposite the high end on the other wedge, whereby said bracket may be mounted in an opening in a panel with said ears engaging the outer surface of the panel and upon movement of said wedges in opposite directions one tapered end on each wedge will engage the rear surface of the panel to clamp said bracket in place.

4. A bracket for mounting in an opening in panels of different thicknesses, said bracket comprising a base member of sheet material, said base member including a generally rectangular base portion, a pair of legs extending from each end edge of said base portion, each leg terminating in an outwardly projecting ear, a flange on each side edge of said base portion and an elongated slot in said base portion adjacent each flange, a pair of elongated slidable clamping wedges mounted on said base portion, the length of each wedge being equal to or less than the length of said base portion, each wedge engaging the inner surface of one of said flanges and with the inner edge of each wedge engaging said base portion, a tongue intermediate the length of each wedge projecting through the adjacent slot and extending beneath said base portion to secure said wedges thereto, the outer edge of each wedge being tapered in opposite directions from the mid-point, the maximum height of one end of each wedge being substantially equal to the minimum height at the opposite end to provide a low and a high end to accommodate a wide range of panel thicknesses and the low end on one wedge being disposed opposite the high end on the other wedge, whereby said bracket may be mounted in an opening in a panel with said ears engaging the outer surface of a panel and upon movement of said wedges in opposite directions one tapered end on each wedge will engage the rear surface of the panel to clamp said bracket in place.

5. A bracket for mounting in an opening in panels of different thicknesses, said bracket comprising a base member of sheet material, said base member including a generally rectangular base portion, a pair of legs extending from each end edge of said base portion, each leg terminating in an outwardly projecting ear, a flange on each side edge of said base portion and an elongated slot in said base portion adjacent each flange, a pair of elongated slidable clamping wedges mounted on said base portion, each wedge engaging an inner surface of one of said flanges and with the inner edge of each wedge engaging said base portion, a tongue intermediate the length of each wedge projecting through the adjacent slot and extending beneath said base portion to secure said wedges thereto, the outer edge of each wedge being tapered in opposite directions from the midpoint, the maximum height of one end of each wedge being substantially equal to the minimum height at the opposite end to provide a low and a high end to accommodate a wide range of panel thicknesses and the low end on one wedge being disposed opposite the high end on the other wedge, whereby said bracket may be mounted in an opening in a panel with said ears engaging the outer surface of the panel and upon movement of said wedges in opposite directions one tapered end on each wedge will engage the rear surface of the panel to clamp said bracket in place.

6. A bracket for mounting in an opening in panels of different thicknesses, said bracket comprising a base member of sheet material, said base member including a generally rectangular base portion, a pair of legs extending from each end edge of said base portion, each leg terminating in an outwardly projecting ear and a flange on each side edge of said base portion, a pair of elongated slidable clamping wedges mounted on said base portion, each wedge engaging the inner surface of one of said flanges and with the inner edge of each wedge engaging said base portion, means to slidably secure said wedges to said base portion, the outer edge of each wedge being tapered in opposite directions from the midpoint, the maximum height of one end of each wedge being substantially equal to the minimum height at the opposite end to provide a low and a high end to accommodate a wide range of panel thicknesses and the low end on one wedge being disposed opposite the high end on the other wedge, whereby said bracket may be mounted in an opening in a panel with said ears engaging the outer surface of the panel and upon movement of said wedges in opposite directions one tapered end on each wedge will engage the rear surface of the panel to clamp said bracket in place.

7. A bracket for mounting in an opening in panels of different thicknesses, said bracket comprising a base member of sheet material, said base member including a generally rectangular base portion, a pair of legs extending from each end edge of said base portion, each leg terminating in an outwardly projecting ear, a pair of elongated clamping wedges mounted on said base portion, means to slidably secure said wedges to said base portion, the outer edge of each wedge being tapered in opposite directions, the maximum height of one end of each wedge being substantially equal to the minimum height at the opposite end to provide a low and a high end to accommodate a wide range of panel thicknesses and the low end on one wedge being disposed opposite the high end on the other wedge, whereby said bracket may be mounted in an opening in a panel with said ears engaging the outer surface of the panel and upon movement of said wedges in opposite directions one tapered end on each wedge will engage the rear surface of the panel to clamp said bracket in place.

8. A bracket as defined in claim 7 in which the inner edge of each wedge is serrated to engage said base portion and lock said wedges in clamping position.

9. A bracket as defined in claim 7 in which the outer tapered edges of said wedges are provided with a series of stepped surfaces for engaging the inner surface of a panel to lock said wedges in clamping position.

10. A bracket as defined in claim 7 in which each wedge is formed of molded plastic to provide a yieldable engagement with the rear surface of a panel and with said base portion to lock said wedges in clamping position.

11. A bracket as defined in claim 7 in which the outer tapered edges of each wedge are coated with a plastic material to engage the inner surface of a panel and lock said wedges in clamping position.

12. A bracket as defined in claim 7 in which the entire surface of each wedge is coated with a plastic material to provide yieldable surfaces engaging said base portion and for engaging the inner surface of a panel to lock said wedges in clamping position.

References Cited in the file of this patent

UNITED STATES PATENTS

| | | |
|---|---|---|
| 2,003,909 | Stark | June 4, 1935 |
| 2,126,114 | Jett | Aug. 9, 1938 |